(12) United States Patent
Bouldin et al.

(10) Patent No.: US 10,415,502 B2
(45) Date of Patent: Sep. 17, 2019

(54) SWIRLING FLOW EDUCTOR SYSTEM AND METHOD

(71) Applicant: HONEYWELL INTERNATIONAL INC., Morris Plains, NJ (US)

(72) Inventors: Bruce Dan Bouldin, Phoenix, AZ (US); Robert Robbins, Chandler, AZ (US); Jonathan Luc Dion, Chandler, AZ (US); Vladimir Gordievsky, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 183 days.

(21) Appl. No.: 15/700,577

(22) Filed: Sep. 11, 2017

(65) Prior Publication Data

US 2019/0078535 A1 Mar. 14, 2019

(51) Int. Cl.
*F02K 1/36* (2006.01)
*F01D 25/12* (2006.01)
(Continued)

(52) U.S. Cl.
CPC ............ *F02K 1/36* (2013.01); *B64D 41/00* (2013.01); *F01D 25/12* (2013.01); *F01D 25/305* (2013.01);
(Continued)

(58) Field of Classification Search
CPC .......... F01D 25/12; F01D 25/305; F02K 1/36; F02K 1/46; B64D 41/00; F05D 2220/32;
(Continued)

(56) References Cited

U.S. PATENT DOCUMENTS

| 4,428,194 A | 1/1984 | Stokes et al. |
| 5,180,278 A | 1/1993 | Warner |

(Continued)

FOREIGN PATENT DOCUMENTS

| EP | 0301993 A2 | 2/1989 |
| EP | 0968918 A2 | 7/1999 |

(Continued)

OTHER PUBLICATIONS

Extended European Search Report for Application No. 18183533 1.5 dated Dec. 13, 2018.

(Continued)

*Primary Examiner* — Igor Kershteyn
(74) *Attorney, Agent, or Firm* — Lorenz & Kopf, LLP

(57) ABSTRACT

Eductor systems and methods improve eduction by increasing swirl. An eductor housing defines a primary plenum channeling a flow stream from an inlet opening to an exit opening, and defines a secondary plenum separated from the primary plenum and channeling another flow stream from a duct inlet to exit slots. A gas flow stream is delivered into the eductor housing and is directed through the exit opening so that the gas flow stream educes the flow stream through the inlet opening and the exit opening. The second flow stream is delivered to the secondary plenum through a duct connected at an angle to induce a swirl in the secondary plenum to effect a static pressure reduction at the exit opening that draws the flow stream from the inlet opening through the exit opening.

20 Claims, 12 Drawing Sheets

(51) Int. Cl.
  *B64D 41/00* (2006.01)
  *F01D 25/30* (2006.01)
  *F02K 1/46* (2006.01)
(52) U.S. Cl.
  CPC ............ *F02K 1/46* (2013.01); *F05D 2220/32* (2013.01); *F05D 2220/50* (2013.01); *F05D 2260/2212* (2013.01); *F05D 2260/601* (2013.01)
(58) Field of Classification Search
  CPC ......... F05D 2220/50; F05D 2260/2212; F05D 2260/601
  See application file for complete search history.

(56) References Cited

U.S. PATENT DOCUMENTS

| | | |
|---|---|---|
| 6,520,738 B2 | 2/2003 | Sheoran et al. |
| 6,615,576 B2 | 9/2003 | Sheoran et al. |
| 7,950,233 B2 | 5/2011 | Alkabie et al. |
| 8,356,486 B2 | 1/2013 | Walters et al. |
| 8,371,521 B2 | 2/2013 | Napier et al. |
| 9,151,501 B2 | 10/2015 | Negulescu |
| 2002/0131862 A1* | 9/2002 | Sheoran ............... B64D 33/02 415/208.1 |
| 2002/0139120 A1 | 10/2002 | Sheoran et al. |
| 2007/0022731 A1* | 2/2007 | Sheoran ............... B64D 41/00 60/39.5 |
| 2007/0089396 A1* | 4/2007 | Anderson ............. B64D 41/00 60/200.1 |
| 2009/0199563 A1 | 8/2009 | Chen |
| 2010/0264261 A1 | 10/2010 | Spakovszky et al. |
| 2014/0130510 A1 | 5/2014 | Bouldin et al. |
| 2015/0218967 A1 | 8/2015 | Anderson et al. |
| 2016/0195109 A1 | 7/2016 | Richards |

FOREIGN PATENT DOCUMENTS

| | | |
|---|---|---|
| EP | 1748177 A1 | 1/2007 |
| EP | 2730507 A2 | 5/2014 |

OTHER PUBLICATIONS

Casey, J.; Honeywell's GTCP36-100 APU; Quit throwing parts at it: Mar. 1, 2000.

\* cited by examiner

SWIRLING FLOW EDUCTOR SYSTEM AND METHOD

STATEMENT REGARDING FEDERALLY SPONSORED RESEARCH OR DEVELOPMENT

This invention was made pursuant to Honeywell Project Number EG-004044-3.1 under a prime contract held by Northrup Grumman, with U.S. Government support. The Government has certain rights in the invention.

TECHNICAL FIELD

The present invention generally relates to eductor systems and methods, and more particularly relates to improved flow systems and methods for an eductor of an auxiliary power unit.

BACKGROUND

An auxiliary power unit ("APU") generates power for supply to various systems, such as those of an aircraft, for purposes such as environmental cooling, lighting, powering electronic systems, and main engine starting. Typically, APUs are located in the aft section of the aircraft such as the tail cone and are contained in a compartment. An APU may be powered by a gas turbine, which includes a compressor stage for supplying pressurized combustion air. During operation, a gas turbine APU produces exhaust gas that is directed through an exhaust system and out of the aircraft. The exhaust system may be connected with an eductor that entrains an airflow stream for cooling purposes, and that may also entrain other gases generated by the aircraft for exhaust to atmosphere. Effective eductor performance is needed for the cooling and entrainment functions.

Accordingly, it is desirable to provide systems and methods that provide enhanced flow of an APU eductor for improved cooling and air entrainment performance. It is also desirable to provide effective control in a cost effective manner Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In a number of embodiments, eductor systems and methods improve eduction by increasing swirl. In some embodiments, an eductor housing defines a primary plenum channeling a flow stream from an inlet opening to an exit opening, and defines a secondary plenum separated from the primary plenum and channeling another flow stream from a duct inlet to exit slots. A gas flow stream is delivered into the eductor housing and is directed through the exit opening so that the gas flow stream educes the flow stream to move through the inlet opening and the exit opening. The other flow stream is delivered to the secondary plenum through a duct connected at an angle to induce a swirl in the secondary plenum. The angle effects a static pressure reduction at the exit opening that draws the flow stream from the inlet opening through the exit opening.

In other embodiments, a method for improving educed flow of an eductor system includes channeling a flow stream from the inlet opening to the exit opening. Another flow stream is channeled from the duct inlet to the exit slots. A gas flow stream is delivered into the eductor housing through a nozzle, and the gas flow stream is directed through the exit opening. The gas flow stream educes the flow stream through the inlet opening and the exit opening. A duct is connected with the secondary plenum at a duct inlet, through which the second flow stream is delivered to the secondary plenum. Swirl of the second flow stream is induced by angling the duct away from the longitudinal axis. The swirl results in a reduced static pressure at the exit opening that draws flow through the exit opening increasing eduction of the flow stream through the inlet opening.

In additional embodiments, a method for improving educed flow of an eductor system is provided for an APU. In addition, the gas flow stream, and the two other flow streams are delivered to an exhaust duct. The swirl results in a reduced static pressure in the exhaust duct and at the exit opening, which draws flow through the exit opening increasing eduction of the flow stream through the inlet opening.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, the improved eduction of a flow stream is accomplished by influencing the flow characteristics of a second flow stream. The flow streams both flow through an eductor system and may exit an eductor housing at a common exit plane. In the examples given, the flow streams are associated with an APU system, but the disclosure is not limited in application to such systems. In general, eductor system performance is improved by adding angles and/or bends to parts of the involved system. Angles and bends are generally associated with effects that result in flow losses, and therefore, are generally avoided when working to improve flow. However, it has been discovered that angles and bends improve induced flow and are therefore desirable, as further described below.

Figure 1:
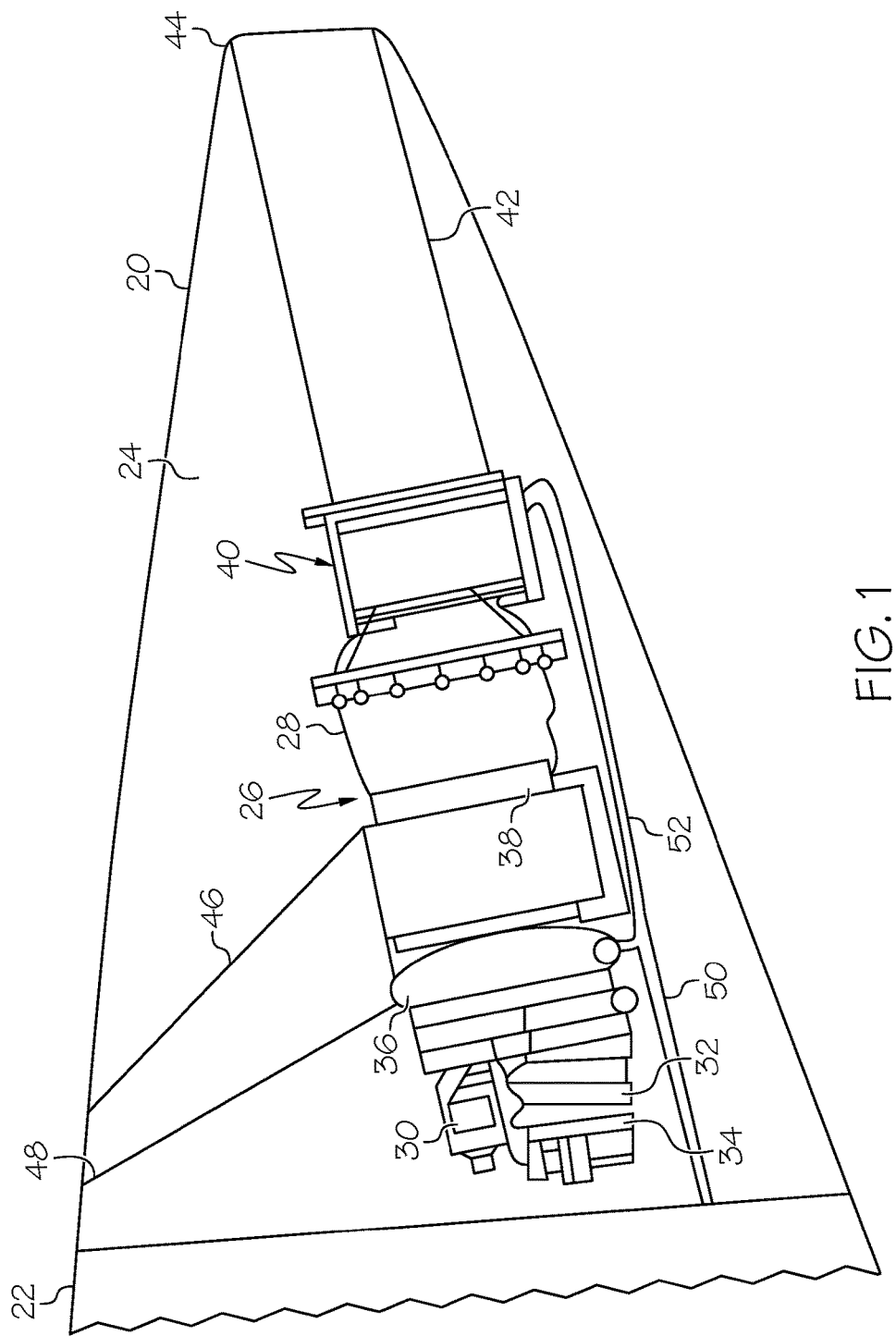
FIG. 1 is a cross-sectional illustration of a tail cone area of an aircraft including an APU with an eductor system disposed therein, according to an exemplary embodiment.

In an exemplary embodiment as illustrated in FIG. 1, the tail cone 20 area of an aircraft 22 defines a compartment 24 that houses an APU 26. The APU 26 generally includes a turbine 28 which powers the APU 26, a starter 30 for starting the APU 26, a gearbox 32 for driving various loads including a generator 34 for supplying electrical power, a load compressor 36 for supplying various pneumatic loads, a power compressor 38 for supplying air to the turbine 28, an eductor system 40 for pumping air, and an exhaust duct 42 for delivering exhaust out of the tail 44 of aircraft 22. In some embodiments the load compressor 36 may be omitted and the various pneumatic loads may be supplied by bleed air from the power compressor 38. The compressors 36, 38 receive outside air from an inlet duct 46 that extends between the APU 26 and an inlet opening 48. The load compressor 36 delivers compressed air for pneumatic powers features of the aircraft 22 through a supply duct 50. Excess air flow generated by the load compressor 36 which isn't needed by the aircraft 22 is delivered to the eductor system 40 through a surge duct 52 for exhaust through the exhaust duct 42. Surge is a phenomenon that is caused by the detachment of fluid streams along compressor airfoils, which leads to instability in the flow and thereby in the operation of the compressor. Accordingly, surge is preferably avoided. The surge duct 52 prevents surge of the load compressor 36 by maintaining a certain flow rate through the surge duct 52, The distribution of flow to the surge duct 52 is regulated by valves (not shown), to accommodate changes in accessory air demand, and to maintain through flow for the load compressor 36 to avoid surge.

Figure 2:
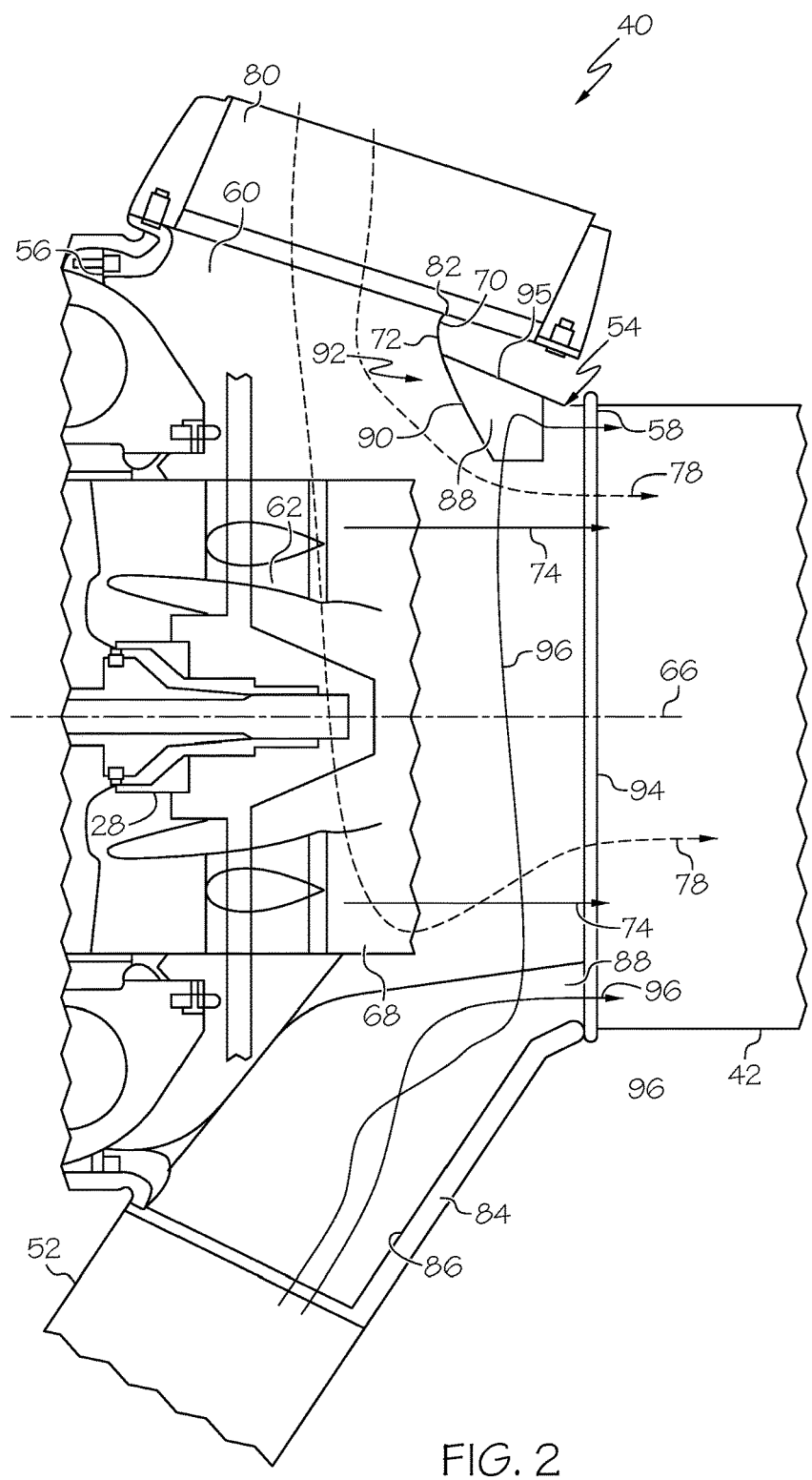
FIG. 2 is a cross-sectional illustration of an exemplary eductor system incorporated into the tail cone depicted in FIG. 1.

In an exemplary embodiment as illustrated in FIG. 2, the eductor system 40 generally includes an eductor housing 54 that connects in the APU 26 downstream of the turbine 28. An upstream end 56 of the eductor housing 54 connects with the turbine 28 and a downstream end 58 connects with the exhaust duct 42. The eductor housing 54 defines a primary plenum 60 that is disposed circumferentially around a turbine exit nozzle 62 and extends along the longitudinal axis 66, as defined by the turbine 28. The longitudinal axis 66 is the center of rotation for the turbine 28 and of the compressors 36, 38. The turbine exit nozzle 62 delivers an exhaust gas flow stream 74 from the turbine 28 to the eductor system 40. A mixer nozzle 68 is disposed around the turbine exit nozzle 62 and extends into the primary plenum 60. In the current embodiment, the mixer nozzle 68 is a lobed nozzle for improved flow stream mixing effectiveness. The primary plenum 60 surrounds the entire circumference of the turbine exit nozzle 62 and the mixer nozzle 68 to maximize contact between high velocity exhaust gas flow stream 74 and a cooling gas flow 78 that is educed.

The eductor housing 54 includes an inlet shroud 70 which defines an inlet opening 72. The exhaust gas flow stream 74 exiting the turbine 28 flows through the eductor housing 54 from the inlet end 56 to the exhaust duct 42 at a high velocity and with a drop in static pressure. As the exhaust gas flow stream 74 passes through the eductor housing 54, cooling air flow stream 78 is drawn through the inlet opening 72 into the primary plenum 60 and is mixed with the exhaust gas flow stream 74. An oil cooler 80 is disposed at the outboard end 82 of the inlet shroud 70, and oil for lubricating the APU 26 is passed through the oil cooler 80. Accordingly, the cooling air flow stream 78 provides an oil cooling function for the APU 26. The cooling air flow stream 78 is drawn from the compartment 24. The resulting air flow through the compartment 24 provides an additional cooling function for the compartment 24 and for the exterior surfaces of the APU 26 therein. The cooling air flow stream 78, when mixed with, and entrained in, the exhaust gas flow stream 74 also cools the exhaust gas stream entering the exhaust duct 42. A higher rate of cooling air flow stream 78 provides greater cooling and is therefore desirable.

The eductor housing 54 includes a duct inlet 84 which defines an inlet opening 86 and which is connected with the surge duct 52. This opens the surge duct 52 to a secondary plenum 88, which is disposed circumferentially around primary plenum 60, adjacent the exit end 58 of the eductor housing 54. The secondary plenum 88 extends along the longitudinal axis 66 of the turbine 28, generally a shorter distance than the primary plenum 60. Excess air from the load compressor 36 is delivered through the surge duct 52 to the secondary plenum 88. It should be appreciated that as indicated above, in some embodiments the secondary plenum 88 may receive bleed air through a duct from the power compressor 38, rather than surge air delivered through the surge duct 52 from the load compressor 36. Similar to load compressor air, bleed air may be utilized for pneumatic power features of the aircraft 22 such as cabin pressurization, pneumatic actuators, air motors, and pressurizing containers. Accordingly, excess bleed air may be exhausted through the secondary plenum 88 in those embodiments. In embodiments that use bleed air, the load compressor 36 may be omitted from the APU 26.

The secondary plenum 88 is annular in shape and may include a variably sized cross-sectional area at different angular locations around the longitudinal axis 66. In some embodiments, the areas gradually decrease as the distance away from the duct inlet 84 increases. The primary plenum 60 and the secondary plenum 88 are separated from each other within the eductor housing 54, and are each defined, in part, by a wall 90. Adjacent the downstream end 58, the eductor housing 54 defines an eductor nozzle 92 that funnels exiting flow, creating a higher velocity flow and a drop in static pressure at an exit plane 94. The exit plane 94 extends across the longitudinal axis 66 and is the point where the eductor housing 54 ends and the exhaust duct 42 begins. The eductor nozzle 92 is defined by a wall section 95 of the eductor housing 54 and the resulting flow velocity increase and drop in static pressure at the exit plane 94 helps draw cooling air through the primary plenum 60. Accordingly, excess air from the load compressor 36 is pushed through the surge duct 52, the secondary plenum 88 and into the exhaust duct 42. The eductor nozzle 92 also helps effect draw of the cooling air flow stream 78 through the primary plenum 60.

Figure 3:
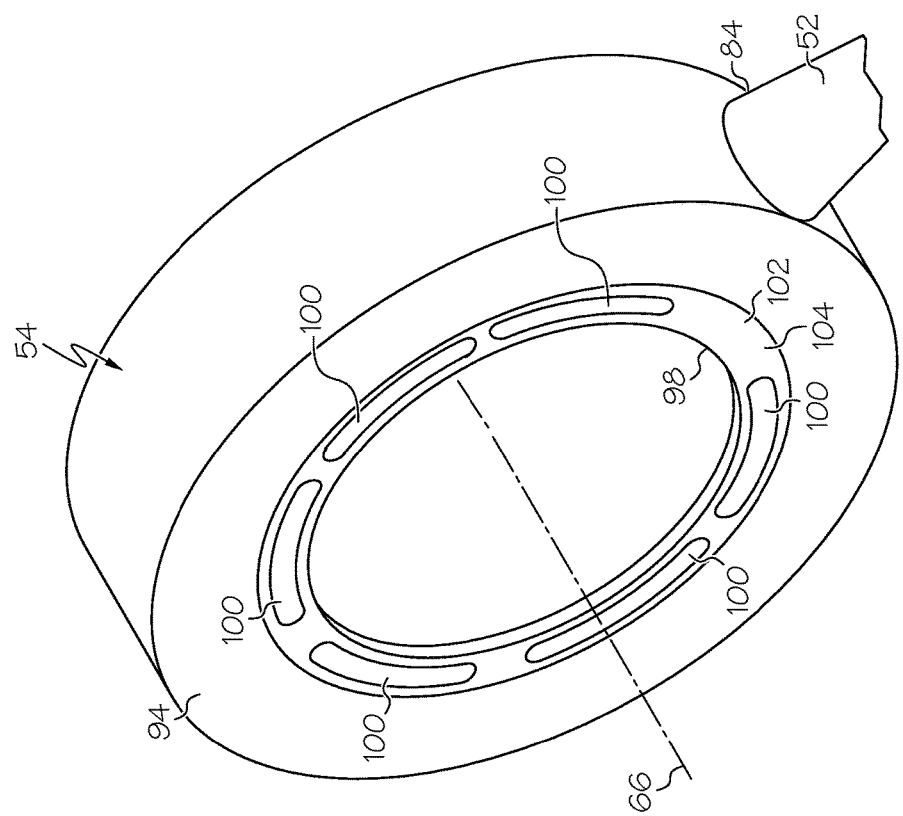
FIG. 3 is a perspective illustration of the eductor housing of the eductor system of FIG. 2, with the exhaust duct removed to show the exit slots.

With additional reference to FIG. 3, the eductor housing 54 is shown from the direction of the exhaust duct 42, which is removed to show details at the exit plane 94. The eductor housing 54 defines an exit opening 98, which opens the primary plenum 60 to the exhaust duct 42. The exit opening 98 is centered on the longitudinal axis 66. When the exhaust gas flow stream 74 enters the eductor housing 54, it is directed at the exit opening 98. The eductor housing 54 also defines a series of exit slots 100, which are distributed in a ring 102 of the eductor housing 54 that extends around the exit opening 98. The exit slots 100 open the secondary plenum 88 to the exhaust duct 42 and may also be referred to as surge slots in this embodiment. Accordingly, the exhaust gas flow stream 74 and the cooling air flow stream 78 pass through the exit opening 98 while the surge air flow stream 96 passes through the exit slots 100. The exit slots 100 are spaced apart from each other and from the exit opening 98. Between the longitudinal axis 66 and the duct inlet 84 where the surge duct 52 connects with the eductor housing 54, the ring 102 has a closed section 104 with no slot. The closed section 104 registers with the duct inlet 84 and helps direct and distribute the surge air flow stream 96 around the secondary plenum 88.

Figure 4:
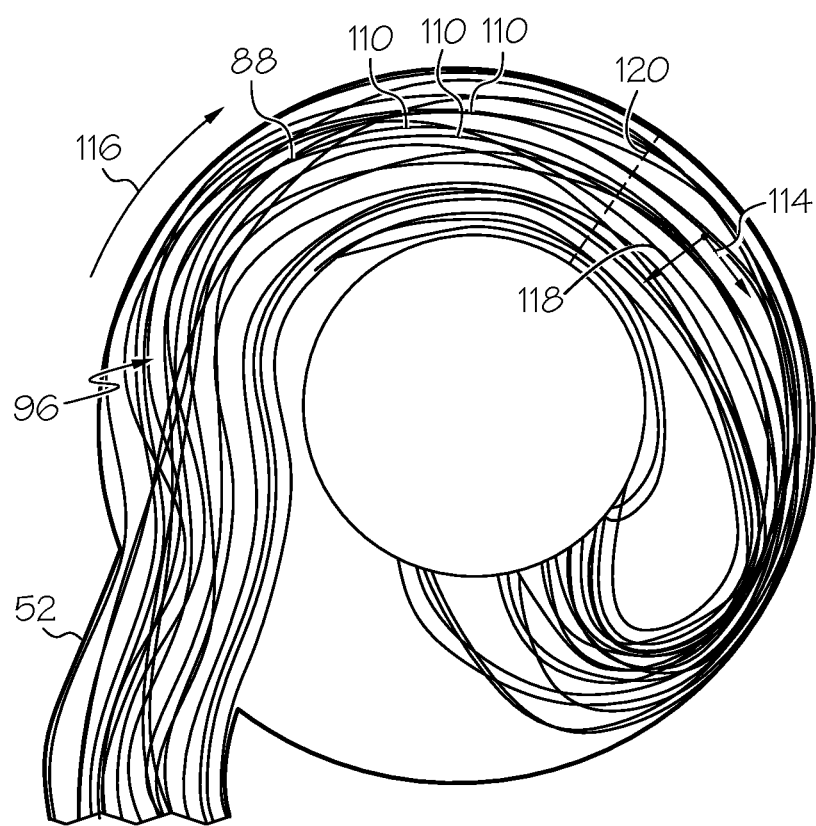
FIG. 4 is a representation of a surge flow stream of the eductor system of FIG. 2 with induced swirl, according to various embodiments.

It has been found that inducing swirl of the surge air flow stream 96 in the secondary plenum 88, increases the mass flow rate of the cooling air flow stream 78 through the exit opening 98, and is therefore desirable. Swirl refers to a flow field state with a tangential flow component of the flow's velocity vector in addition to an axial component, where the axial component is the direction the flow is traveling. The tangential component is characterized relative to the axial component of the flowing fluid and is associated with a swirling flow stream. Due to the tangential component, swirl is characterized by rotation or twisting action of the flowing fluid as it travels. An example of swirl is illustrated in FIG. 4 where flow lines 110 represent the surge air flow stream 96 within the secondary plenum 88. The flow lines 110 have an axial flow component 114 in h flow direction 116, and a tangential flow component 118 tangential to the circumference 120 of the surge air flow stream 96. Accordingly, the flow lines 110 represent the swirling flow and rotate in a circumferential manner as they travel in the flow direction 116. It will be appreciated that turbulence may be associated with swirl and a lack of turbulence/uniformity in a flow stream is generally an objective in managing air flow. Accordingly, swirl has heretofore been avoided in eductor designs. However, it has unexpectedly been discovered as part of the exemplary embodiment, that inducing swirl in the surge air flow stream 96 increases the pumping action of the eductor system 40. It has also been discovered that swirl in the secondary plenum 88 is induced by connecting the surge duct 52 with the eductor housing 54 at an angle other than normal relative to the longitudinal axis 66.

Figure 5:
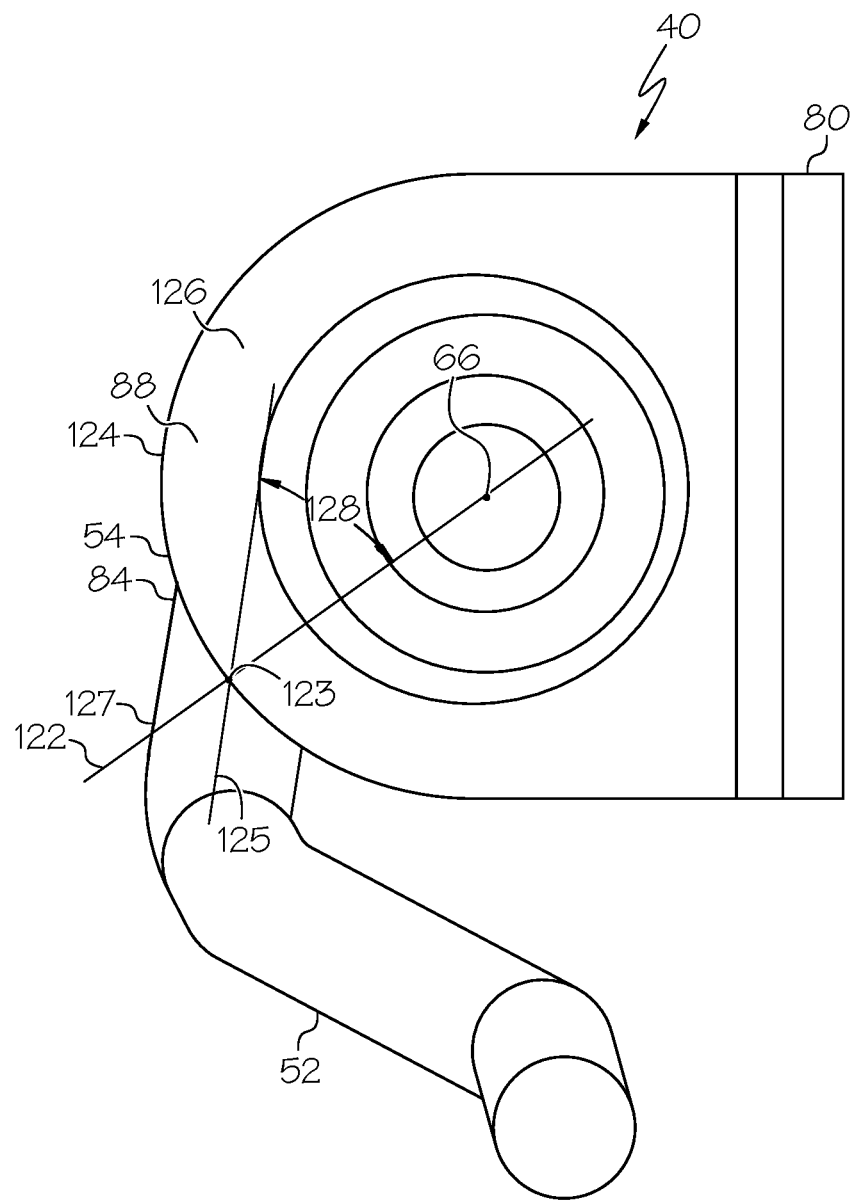
FIG. 5 is a perspective illustration of the eductor system of FIG. 2, showing the surge duct, according to various embodiments.

More specifically, with reference to FIG. 5, an exemplary embodiment of the eductor system 40 includes the surge duct 52 connected with the eductor housing 54 at the duct inlet 84. For reference, a center 123 of the surge duct 52/duct inlet 84 is identified as being disposed at the outer perimeter 124 of the wall 126 of the eductor housing 54 that defines the secondary plenum 88. The center 123 is the center of a cross section of the surge duct 52/duct inlet 84. For example, in a circular duct, the center is the origin of a radius of the duct. A normal line 122 is defined as extending through the center 123, and through the longitudinal axis 66. The normal line 122 is "normal" i.e. disposed at ninety-degrees relative to the longitudinal axis 66 as viewed in FIG. 2, and is directed at the longitudinal axis 66 when viewed in FIG. 5. In the exemplary embodiment, the end 127 of the surge duct 52 and the duct inlet 84 are disposed around a centerline 125, which extends through their longitudinal center, including the center 123, and is directed at an angle 128 relative to the normal line 122. Accordingly, the surge duct 52 and duct inlet 84 deliver the surge air flow stream 96 into the secondary plenum 88 at the angle 128. In the current example the angle is approximately thirty degrees, which varies in other embodiments. Connecting the surge duct 52 to the eductor housing 54 at the angle 128 induces swirl of the surge air flow stream 96 in the secondary plenum 88. The induced swirl concentrates the surge air flow stream 96 within the open cross section of the secondary plenum 88

Figure 6:
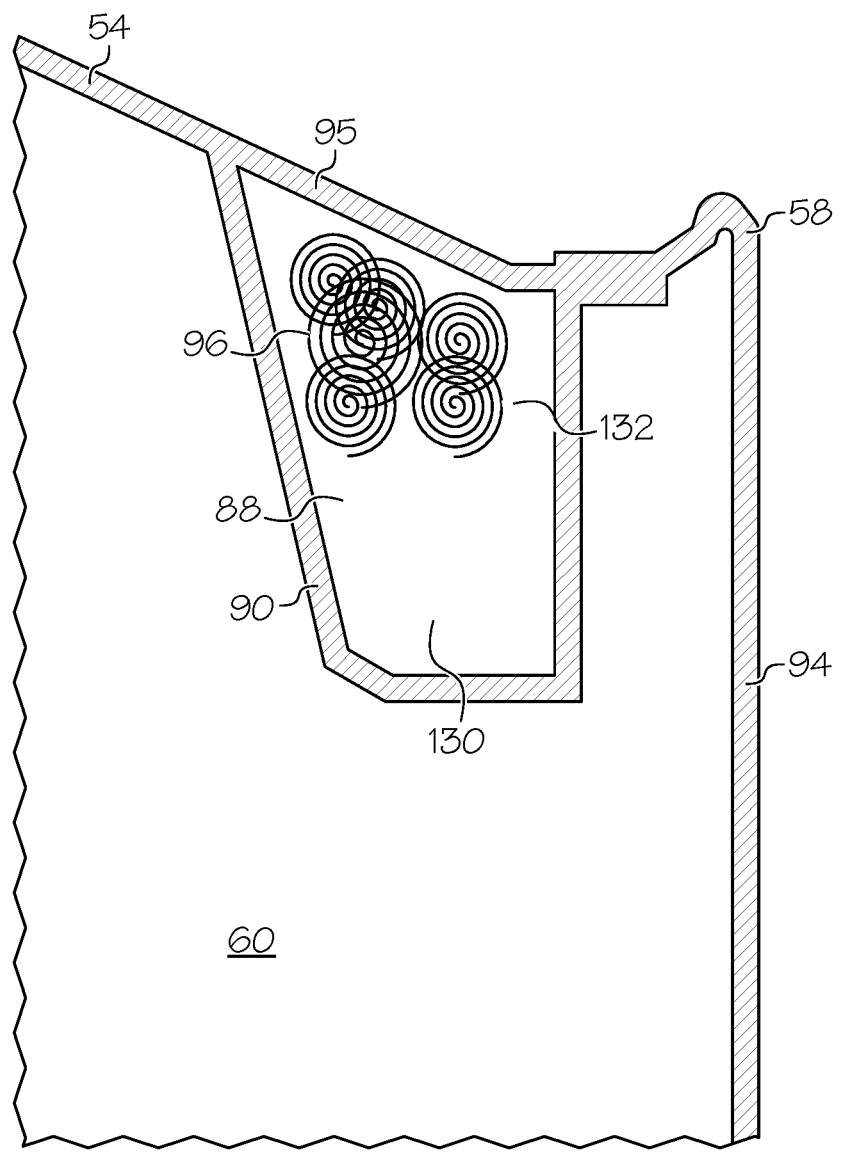
FIG. 6 is a detail illustration of the secondary plenum area of the eductor system of FIG. 2.

As shown in FIG. 6, the secondary plenum 88 includes a geometric cross sectional area 130 defined by the wall 90 and the wall section 95. As described above, the geometric cross sectional area 130 of the secondary plenum 88 may vary in size around the perimeter of the eductor housing 54. With the induced swirl, the surge air flow stream 96 is concentrated in an effective area 132 of the secondary plenum 88 that is less than the geometric cross sectional area 130. As a result, the velocity of the surge air flow stream 96 is greater than the velocity that would result in the absence of the induced swirl. The effect is that the surge air flow stream 96 exits the secondary plenum 88 through the exit slots 100 at a greater velocity, creating a lower static pressure at the exit plane 94 as seen by the exhaust gas flow stream 74 and the cooling air flow stream 78. The lower static pressure results in an increased mass flow rate of the cooling air flow stream 78. Increased flow rate draws more cooling air through the compartment 24 and the oil cooler 80, which improves cooling.

Figure 7:
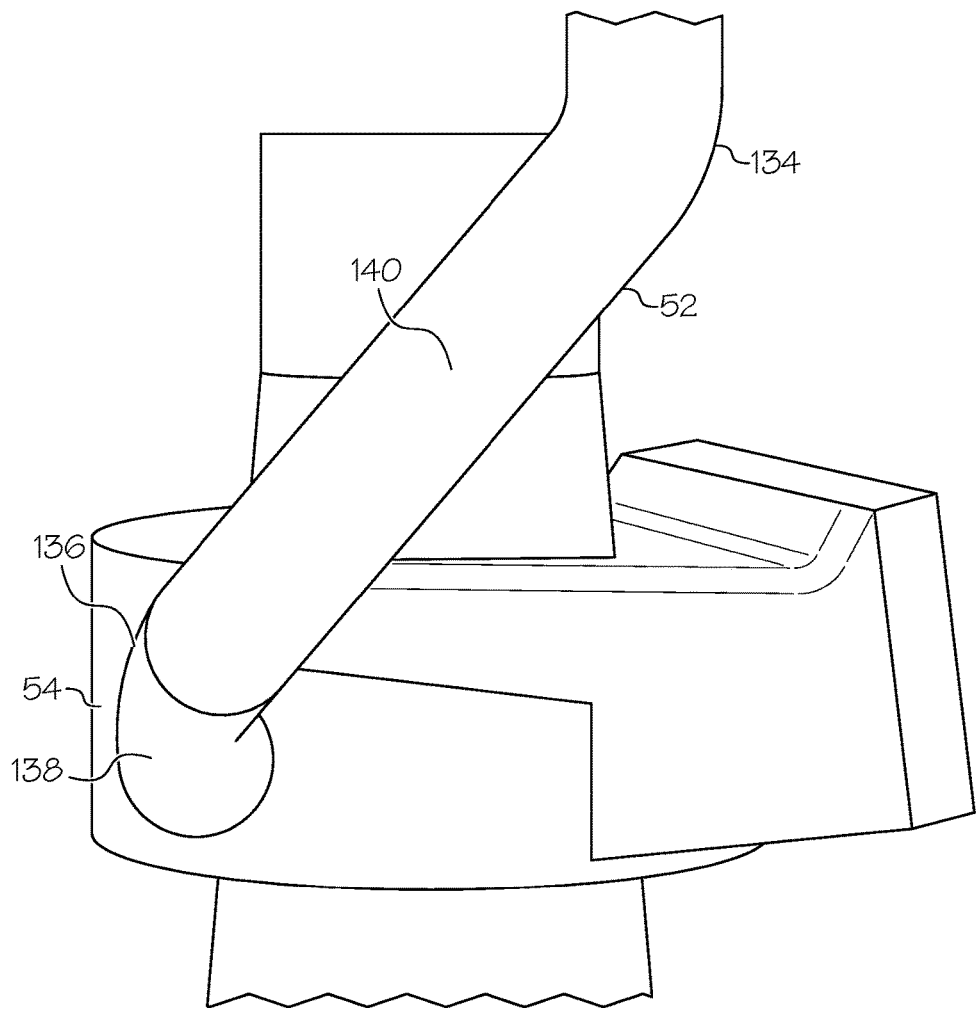
FIG. 7 is another perspective illustration of the eductor system of FIG. 5, showing the surge duct, according to various embodiments.
Figure 8:
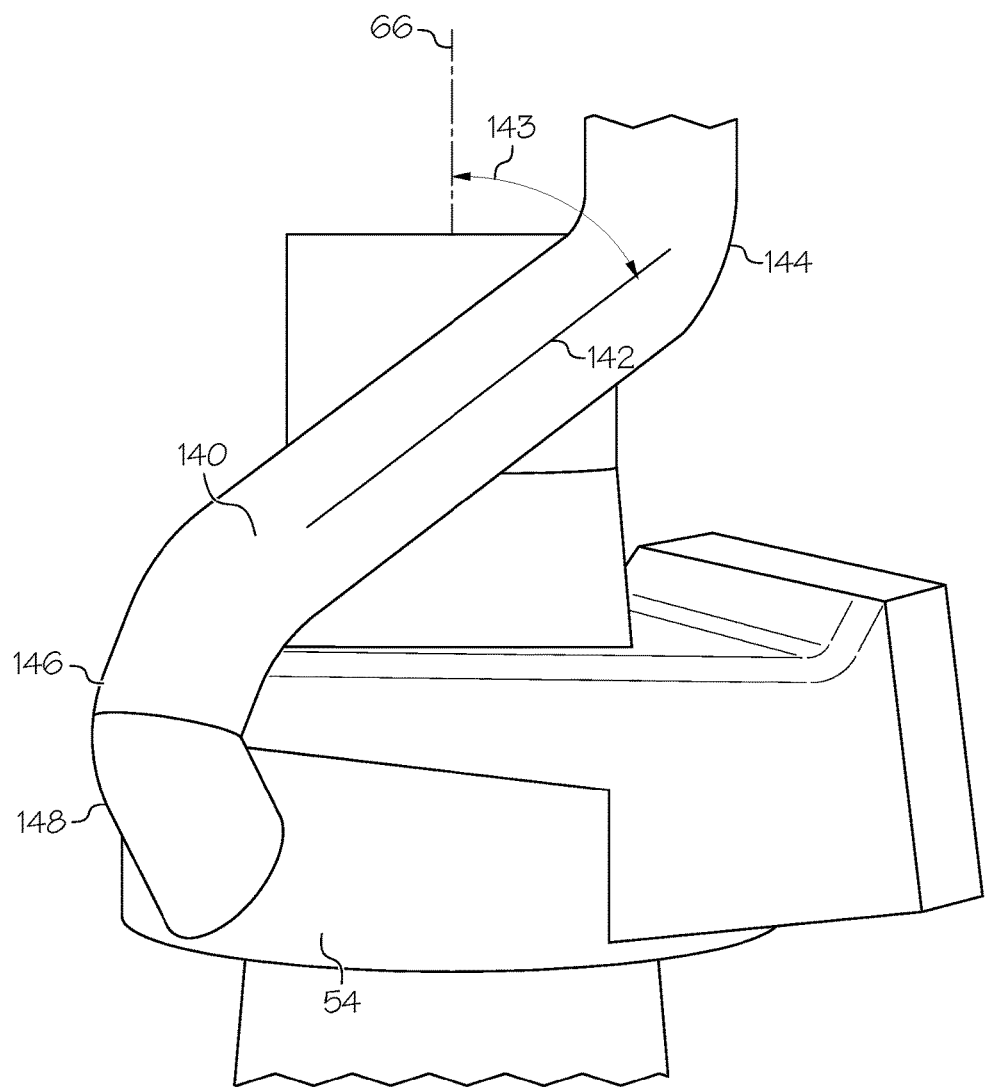
FIG. 8 is a perspective illustration of the eductor system of FIG. 2, showing a surge duct, according to additional embodiments.

The exemplary embodiment of FIG. 5 is shown from a different perspective in FIG. 7, to which reference is also directed. The surge duct 52 includes ells or bends 134, 136 and 138 adjacent the duct section 140 approaching the eductor housing 54. It has also been unexpectedly discovered that the bends 134 are advantageous in increasing swirl in the surge air flow stream 96, and therefore, in increasing cooling air flow stream 78. As shown in FIG. 8, the surge duct 52 has been modified from that of FIG. 7 so that it is more bent. The slope 142 of the duct section 140 is changed so that the bends 144 and 146 are tighter than the bends 134 and 136, respectively. Similarly, the bend 148 is formed tighter than the bend 138. Accordingly, the surge air flow stream 96 passing through each of the bends 144, 146 and 148 must make a greater change in direction as it passes through. The slope 142 is increased meaning that the angle 143 of the duct section 140 relative to the longitudinal axis 66 is increased. As noted above, ells and bends are typically associated with flow losses. In the case of the current embodiments, making the duct section 140 more bent by increasing the magnitude of the angle through which the surge air flow stream 96 must turn when passing through the bends 144, 146, 148 increases swirl. As such, making the bends 134, 136, 138 tighter may increase flow losses through the surge duct 52, but desirably increases swirl in the secondary plenum 88. As a result, the mass flow rate of the cooling air flow stream 78 is increased. Surge air flow 96 is excess and unwanted air flow and is being directed overboard so additional flow losses are not a concern. An eductor without the angled or bent surge duct configurations of FIGS. 5, 7 and 8, results in a cooling air flow stream of 0.560 pounds/second. The angled surge duct 52 of FIGS. 5 and 7 results in a cooling air flow stream 78 of 0.582 pounds/second. The angled and bent surge duct 52 of FIG. 8 results in a cooling air flow stream 78 of 0.603 pounds/second. Accordingly, angling and/or bending the surge duct 52 improves the mass flow rate of the cooling air flow stream 78. Both angling and making the surge duct 52 more bent has been found to provide the greatest improvement in the mass flow rate of the cooling air flow stream 78.

Figure 9:
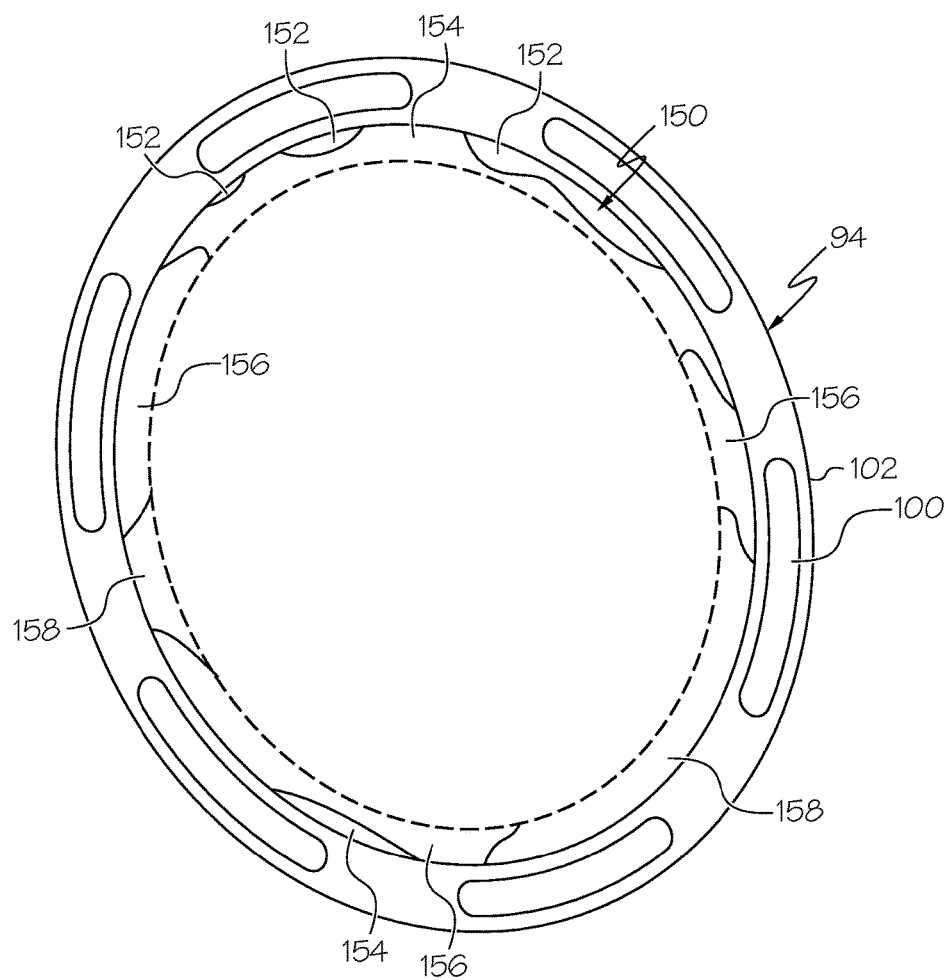
FIG. 9 is a plot of static pressure at an eductor exit plane for an example surge duct that directs flow to enter the eductor plenum normal to the eductor's longitudinal axis.
Figure 10:
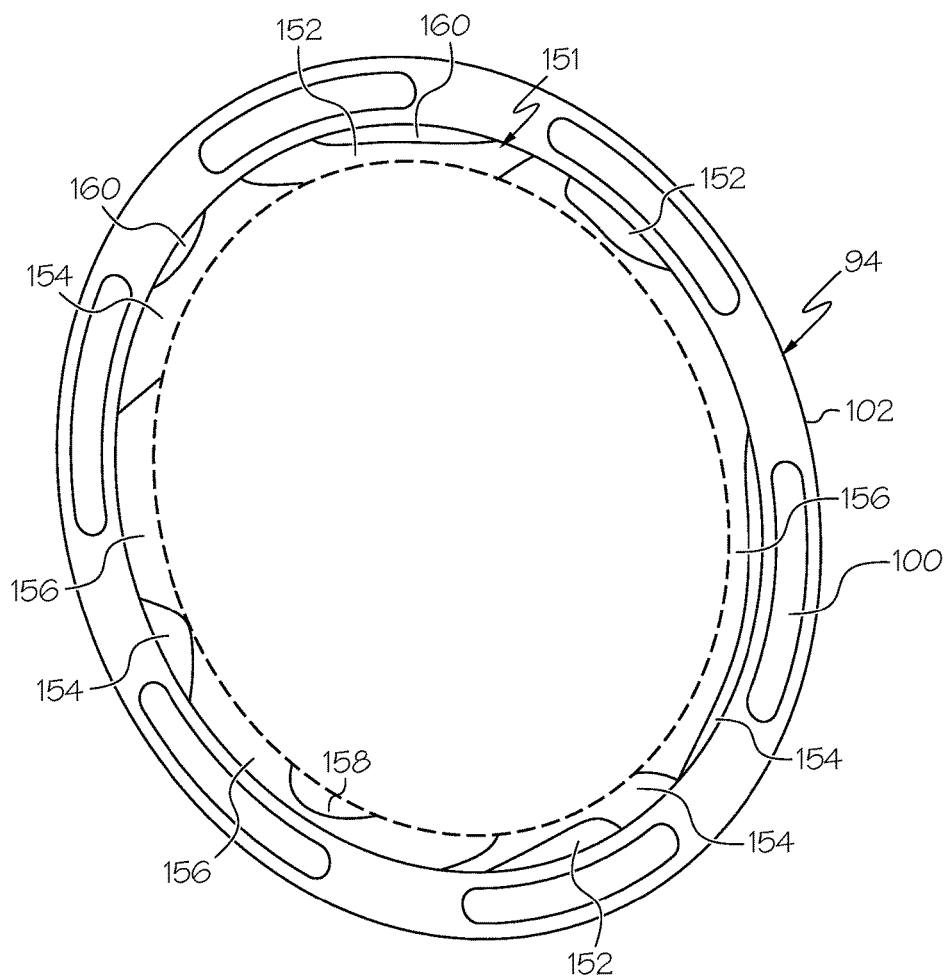
FIG. 10 is a plot of static pressure at the eductor exit plane for the eductor system according to the embodiment of FIGS. 5 and 7, which directs flow to enter the eductor plenum at an angle away from the eductor's longitudinal axis.
Figure 11:
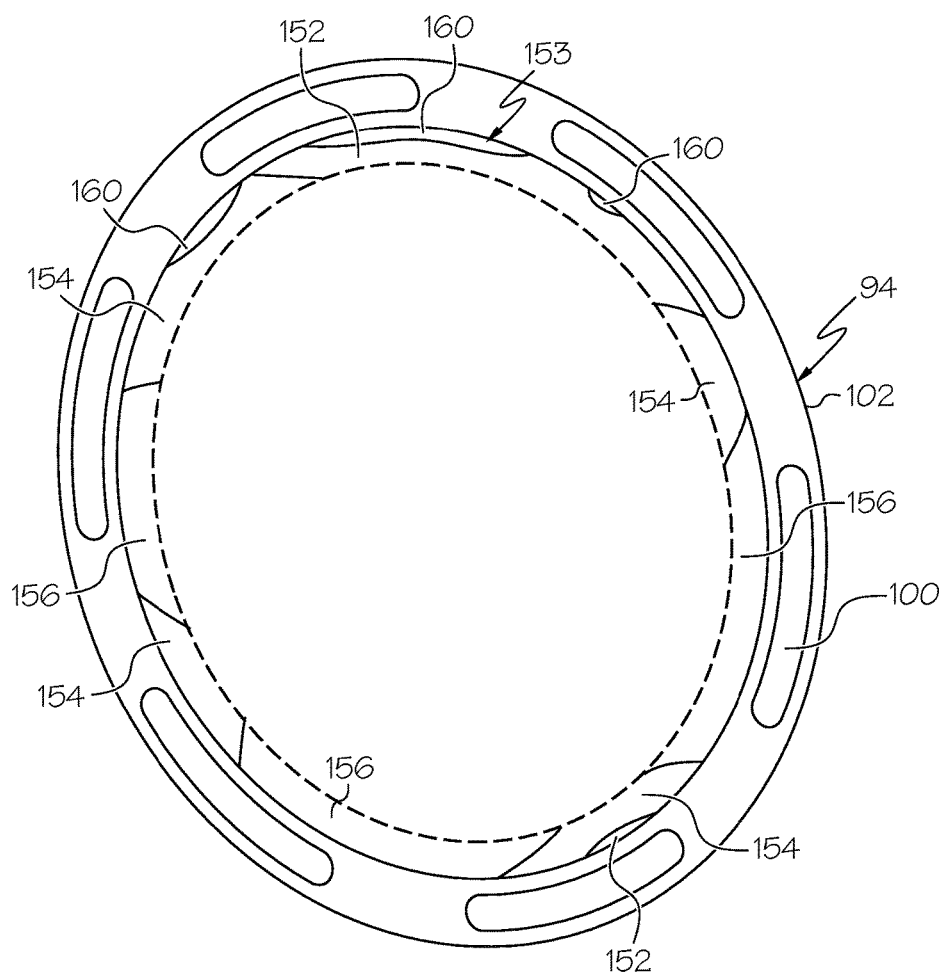
FIG. 11 is a plot of static pressure at the eductor exit plane for the eductor system according to the embodiment of FIG. 8, with a bent surge duct that directs flow to enter the eductor plenum at an angle to the eductor's axis.

With reference to FIGS. 9-11, improving the cooling air flow stream 78 by angling or bending the surge duct 52 is demonstrated through images generated using computational fluid dynamics (CFD) simulation, such as with commercially available software. FIG. 9 shows a pressure distribution 150 for an example eductor system for demonstration purposes without the angled or bent surge duct configurations of FIGS. 5, 7 and 8. The pressure distribution 150 is shown for an annular area of the exit plane 94, radially inside the ring 102. The ring 102 is where the exit slots 100 are disposed, and therefore their effect on the annular area is shown. The pressure distribution 150 is of interest, because the surge air flow stream 96 contributes to the pressures that result in this area and those pressures contribute to the mass flow rate of the cooling air flow stream 78. As shown in FIG. 9, the pressure distribution 150 includes pressure areas 152 at pressures between 14.5125 psi and 14.5250 psi. The pressure distribution 150 also includes pressure areas 154 at pressures between 14.5250 psi and 14.5375 psi. The pressure distribution 150 also includes pressure areas 156 at pressures between 14.5375 psi and 14.55 psi. The pressure distribution also includes pressure areas 158 at pressures between 14.55 psi and 14.5625 psi.

FIG. 10 shows a pressure distribution 151 for the eductor system of FIGS. 5 and 7, with the angled surge duct 52. The pressure distribution 151 is again shown for the annular area of the exit plane 94, radially inside the ring 102. The pressure distribution 151 includes pressure areas 160 at pressures between 14.50 psi and 14.5125 psi. The pressure distribution 151 also includes pressure areas 152 at pressures between 14.5125 psi and 14.5250 psi. The pressure distribution 151 also includes pressure areas 154 at pressures between 14.5250 psi and 14.5375 psi. The pressure distribution 151 also includes pressure areas 156 at pressures between 14.5375 psi and 14.55 psi. The pressure distribution 151 also includes pressure areas 158 at pressures between 14.55 psi and 14.5625 psi. As illustrated in FIGS. 9 and 10, the resulting lower pressure areas cover more area in the pressure distribution 151 than in the pressure distribution 150. For example, FIG. 10 includes the lower pressure areas 160 at pressures between 14.50 psi and 14.5125 psi, while FIG. 9 does not. As a result, the static pressure at the exit plane 94 as seen by the cooling air flow stream 78 is lower overall in FIG. 10, educing a greater mass flow rate of the cooling air flow stream 74 in the eductor system 40.

FIG. 11 shows a pressure distribution 153 for the eductor system of FIG. 8 with the angled and bent surge duct 52. The pressure distribution 153 is again shown for the annular area of the exit plane 94, radially inside the ring 102. The pressure distribution 153 includes pressure areas 160 at pressures between 14.50 psi and 14.5125 psi. The pressure distribution 153 also includes pressure areas 152 at pressures between 14.5125 pounds/square inch and 14.5250 psi. The pressure distribution 153 also includes pressure areas 154 at pressures between 14.5250 psi and 14.5375 psi. The pressure distribution 153 also includes pressure areas 156 at pressures between 14.5375 psi and 14.55 psi. As illustrated in FIGS. 9, 10 and 11, the lower pressure areas cover more area in the pressure distribution 153 than in the pressure distribution 150 or the pressure distribution 151. For example, FIG. 11 includes larger pressure areas 160 and no pressure area 158. As a result, the static pressure at the exit plane 94 as seen by the cooling air flow stream 78 is lower overall in FIG. 11, educing a greater mass flow rate of the cooling air flow stream 74 in the eductor system 40. While differences of pressure distributions 151 and 153 compared to 150 are small, eductors are extremely sensitive to variations in pressure and their pumping capability will change accordingly.

Figure 12:
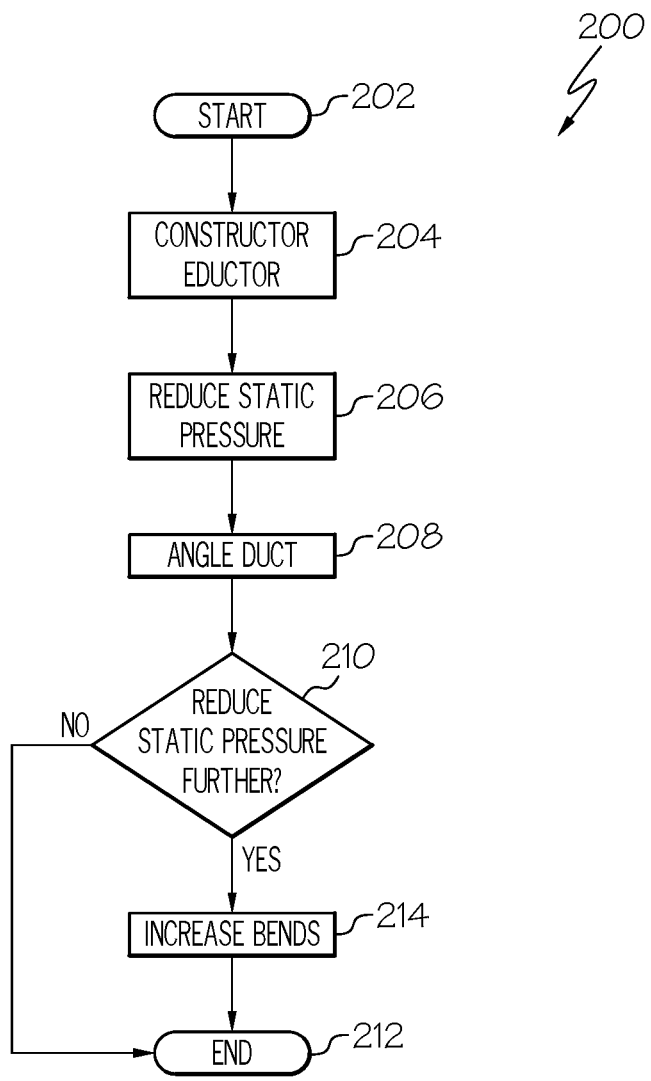
FIG. 12 is a flow chart of a process illustrating methods for improving educed flow, according to a number of embodiments.

Accordingly, methods for improving eductor performance consistent with the foregoing include a process 200 that includes inducing swirl through angling and/or bending of a duct leading to the eductor. As shown in FIG. 12, the process 200 begins at step 202 with the design and fabrication of an eductor system such as the eductor system 40. The eductor system 40 is constructed at step 204 to include the primary and secondary plenums 60, 88. The primary plenum 60 delivers flow through the exit opening 98 and the secondary plenum delivers flow through slots around the exit opening, such as the exit slots 100. Flow into the primary and secondary plenums 60, 88 is separate with flow entering the primary plenum 60 through the inlet opening 72 and flow entering the secondary plenum 88 from a duct inlet 84 with a connected duct such as the surge duct 52. In other embodiments, the surge duct 52 may connect directly to the eductor housing 54, without including the duct inlet 84. At step 206, the process 200 includes reducing static pressure at the exit opening 98. Reducing the static pressure results in increased flow through the inlet opening 72. The static pressure at the exit opening 98 is reduced by angling the surge duct 52 and the duct inlet 84 at step 208 so that their centerline 125 is disposed at an angle 128 relative to a normal line 122. Angling the surge duct 52 and the duct inlet 84 induces swirl in the secondary plenum 88, and thereby reduces the static pressure at the exit opening 98 as described above. At step 210, a determination is made as to whether further reduction of the static pressure by increasing bends in the surge duct 52 is desirable or practical. For example, packaging space may not allow routing changes in the surge duct 52 to increase bendiness. When the determination at step 210 is that bending of the surge duct 52 will not be undertaken, the process 200 ends at step 212. When the determination at step 212 is that bending of the surge duct 52 will be undertaken, the process 200 proceeds to step 214 where bends are added to the surge duct 52, or the angles of existing bends are increased. For example, the angles of the bends 134, 136 and 138 are increased to those of the bends 144, 146 and 148, respectively. Making the surge duct 52 more bent induces or increases swirl in the secondary plenum 88 which reduces static pressure at the exit opening 98. The process then ends at step 212. Accordingly, flow through the primary plenum is further increased by making the surge duct 52 more bent. Through the process 200, the eductor system 40 educes greater flow through the primary plenum 60, than would occur in the absence of the angled and bent surge duct 52.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An eductor system comprising:
an eductor housing defining a primary plenum with an inlet opening and an exit opening, wherein the primary plenum is disposed around a longitudinal axis and is configured to channel a first flow stream from the inlet opening to the exit opening, and the eductor housing defines a secondary plenum with a duct inlet and a number of exit slots, the secondary plenum separated from the primary plenum and configured to channel a second flow stream from the duct inlet to the exit slots;
a nozzle through which a gas flow stream is delivered into the eductor housing, the gas flow stream directed through the exit opening so that the gas flow stream educes the first flow stream through the inlet opening and the exit opening; and
a duct connected with the secondary plenum at the duct inlet, and through which the second flow stream is delivered to the secondary plenum, the duct connected to the secondary plenum at an angle so that the second flow stream is directed away from the longitudinal axis, wherein the duct is configured with the angle to induce a swirl of the second flow stream to effect a static pressure at the exit opening that draws the first flow stream through the exit opening.

2. The system of claim 1 wherein the duct includes a number of bends configured to further induce the swirl of the second flow stream.

3. The system of claim 1 wherein:
the eductor housing includes a wall that defines the secondary plenum and that has an outer perimeter where the wall is most distant from the longitudinal axis;
the duct inlet is defined around a center located at the outer perimeter;
a normal line is defined as extending through the center and the longitudinal axis; and
the duct and the duct inlet are defined around a centerline disposed at the angle relative to the normal line.

4. The system of claim 3 wherein the angle is greater than zero degrees.

5. The system of claim 3 wherein the angle is approximately thirty degrees.

6. The system of claim 1 comprising a gas turbine disposed to rotate around the longitudinal axis and located adjacent the eductor housing, wherein the gas turbine delivers the gas flow stream.

7. The system of claim 6 comprising a compressor connected with the gas turbine, wherein the duct extends from the compressor to the eductor housing.

8. The system of claim 1 comprising a ring defined by the eductor housing and encircling the exit opening, with the exit slots distributed around the ring, wherein a closed section of the ring is disposed between the longitudinal axis and the duct inlet to register with the duct inlet.

9. A method for improving educed flow of an eductor system that has an eductor housing defining a primary plenum with an inlet opening and an exit opening, wherein the primary plenum is disposed around a longitudinal axis and the eductor housing defines a secondary plenum with a duct inlet and a number of exit slots, the secondary plenum separated from the primary plenum, the method comprising:
channeling a first flow stream from the inlet opening to the exit opening;
channeling a second flow stream from the duct inlet to the exit slots;
delivering a gas flow stream into the eductor housing through a nozzle wherein the gas flow stream is directed through the exit opening;
educing, by the gas flow stream, the first flow stream through the inlet opening and the exit opening;
connecting a duct with the secondary plenum at a duct inlet, through which the second flow stream is delivered to the secondary plenum; and
inducing a swirl of the second flow stream to effect a static pressure at the exit opening, by angling the duct so that the second flow stream is directed away from the longitudinal axis, wherein the static pressure draws the first flow stream through the exit opening increasing eduction of the first flow stream.

10. The method of claim 9 comprising further inducing the swirl of the second flow stream by increasing a bend angle of the duct.

11. The method of claim 10 wherein increasing the bend angle comprises increasing a slope of a duct section of the duct, wherein an angle of the duct section relative to the longitudinal axis is increased.

12. The method of claim 9 comprising:
defining the secondary plenum with a wall of the eductor housing wherein the wall has an outer perimeter that is a part of the wall most distant from the longitudinal axis;
defining the duct inlet around a center located at the outer perimeter, wherein a normal line is defined as extending through the center and the longitudinal axis; and
angling the duct and the duct inlet relative to the normal line.

13. The method of claim 12 comprising setting the angle at greater than zero degrees.

14. The method of claim 12 comprising setting the angle at approximately thirty degrees.

15. The method of claim 9 comprising:
delivering the gas flow stream through a gas turbine disposed around the longitudinal axis adjacent the eductor housing;
connecting a compressor with the gas turbine; and
extending the duct from the compressor to the eductor housing.

16. The method of claim 9 comprising:
encircling the exit opening with a ring defined by the eductor housing;
distributing the exit slots around the ring; and
leaving a closed section of the ring disposed between the longitudinal axis and the duct inlet, and positioned to register with the duct inlet.

17. A method for improving educed flow of an eductor system of an auxilliary power unit, wherein the eductor system has an eductor housing disposed downstream from a gas turbine, the eductor housing defines a primary plenum with an inlet opening and an exit opening, wherein the primary plenum is disposed around a longitudinal axis, and the eductor housing defines a secondary plenum with a duct inlet and a number of exit slots, the secondary plenum separated from the primary plenum, the method comprising:

- channeling a first flow stream from the inlet opening to the exit opening;
- channeling a second flow stream from the duct inlet to the exit slots;
- delivering a gas flow stream from the gas turbine and into the eductor housing through a nozzle, wherein the gas flow stream is directed through the exit opening and into an exhaust duct;
- educing, by the gas flow stream, the first flow stream through the inlet opening and the exit opening;
- connecting a duct with the secondary plenum at a duct inlet, through which the second flow stream is delivered to the secondary plenum; and
- inducing a swirl of the second flow stream in the secondary plenum to effect a static pressure in the exhaust duct at the exit opening by angling the duct inlet so that the second flow stream is directed away from the longitudinal axis, wherein the static pressure draws the first flow stream through the exit opening to increase eduction of the first flow stream.

18. The method of claim 17 comprising further inducing the swirl of the second flow stream by increasing a bend angle of the duct.

19. The method of claim 18 wherein increasing the bend angle comprises increasing a degree through which the second flow stream turns when passing through a number of bends of the duct.

20. The method of claim 19 wherein increasing the bend angle comprises increasing a slope of a duct section of the duct, wherein an angle of the duct section relative to the longitudinal axis is increased.

* * * * *